(12) United States Patent
Funk et al.

(10) Patent No.: US 12,431,129 B2
(45) Date of Patent: Sep. 30, 2025

(54) VOICE ASSISTANT ERROR DETECTION SYSTEM

(71) Applicant: CERENCE OPERATING COMPANY, Burlington, MA (US)

(72) Inventors: Markus Funk, Merelbeke (BE); Holger Quast, Ghent (BE)

(73) Assignee: Cerence, Burlington, MA (US)

( * ) Notice: Subject to any disclaimer, the term of this patent is extended or adjusted under 35 U.S.C. 154(b) by 466 days.

(21) Appl. No.: 17/951,715

(22) Filed: Sep. 23, 2022

(65) Prior Publication Data

US 2023/0103202 A1 Mar. 30, 2023

Related U.S. Application Data

(60) Provisional application No. 63/249,250, filed on Sep. 28, 2021.

(51) Int. Cl.
*G10L 15/22* (2006.01)
*G10L 15/18* (2013.01)
*G10L 15/30* (2013.01)
*G10L 25/63* (2013.01)

(52) U.S. Cl.
CPC .......... *G10L 15/1815* (2013.01); *G10L 15/22* (2013.01); *G10L 15/30* (2013.01); *G10L 25/63* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 11,776,534 B1* | 10/2023 | Kulakarni | ........... | G10L 15/1815 |
| | | | | 704/257 |
| 11,809,480 B1* | 11/2023 | Cheng | .................. | G06F 16/434 |
| 11,899,714 B1* | 2/2024 | Bueche | ...................... | G06F 3/16 |
| 2003/0023432 A1* | 1/2003 | Kyomitsu | ............... | G10L 15/20 |
| | | | | 704/231 |
| 2003/0061029 A1* | 3/2003 | Shaket | .................... | G06F 40/35 |
| | | | | 704/E15.04 |
| 2014/0278391 A1* | 9/2014 | Braho | ..................... | G10L 25/78 |
| | | | | 704/233 |
| 2016/0014273 A1* | 1/2016 | Joh | ......................... | G10L 15/28 |
| | | | | 455/563 |
| 2017/0076734 A1* | 3/2017 | Subasingha | ............. | G10L 25/81 |
| 2020/0220935 A1* | 7/2020 | Bao | ......................... | G10L 17/22 |
| 2020/0380212 A1* | 12/2020 | Butler | .................... | G06N 20/00 |
| 2021/0074285 A1* | 3/2021 | Golikov | .................. | G10L 15/22 |

(Continued)

*Primary Examiner* — Neeraj Sharma
(74) *Attorney, Agent, or Firm* — Brooks Kushman, P.C.

(57) ABSTRACT

A vehicle system for classifying spoken utterance within a vehicle cabin as one of system-directed and non-system directed, the system may include at least one microphone configured to detect at least one acoustic utterance from at least one occupant of a vehicle, at least one sensor to detect user behavior data indicative of user behavior, and a processor programmed to: receive the acoustic utterance, classify the acoustic utterance as one of a system-directed utterance and a non-system directed utterance, determine whether the acoustic utterance was properly classified based on user behavior observed via data received from the sensor after the classification, and apply a mitigating adjustment to classifications of subsequent acoustic utterances based on an improper classification.

14 Claims, 2 Drawing Sheets

(56) References Cited

U.S. PATENT DOCUMENTS

| | | | |
|---|---|---|---|
| 2021/0383796 A1* | 12/2021 | Coucke | G10L 15/22 |
| 2021/0407520 A1* | 12/2021 | Neckermann | G10L 17/16 |
| 2022/0293125 A1* | 9/2022 | Maddika | G10L 25/51 |
| 2022/0358914 A1* | 11/2022 | Eda | G10L 25/78 |
| 2023/0325146 A1* | 10/2023 | Mistry | G10L 17/22 |
| | | | 715/706 |

* cited by examiner

VOICE ASSISTANT ERROR DETECTION SYSTEM

CROSS-REFERENCE TO RELATED APPLICATIONS

This application claims the benefit of U.S. provisional application Ser. No. 63/249,250 filed Sep. 28, 2021, the disclosure of which is hereby incorporated in its entirety by reference herein.

FIELD OF THE INVENTION

Described herein are error detection mechanisms for voice assistant systems.

BACKGROUND

Many systems and applications are presently speech enabled, allowing users to interact with the system via speech (e.g., enabling users to speak commands to the system). Engaging speech-enabled systems often requires users to signal to the system that the user intends to interact with the system via speech. For example, some speech recognition systems may be configured to begin recognizing speech once a manual trigger, such as a button push (e.g., a button of a physical device and/or a button within a speech recognition software application), launch of an application, or other manual interaction with the system is provided to alert the system that speech following the trigger is directed to the system. However, manual triggers complicate the interaction with the speech-enabled system and, in some cases, may be prohibitive (e.g., when the user's hands are otherwise occupied, such as when operating a vehicle, or when the user is too remote from the system to manually engage with the system or an interface thereof).

Some speech-enabled systems allow for voice triggers to be spoken to begin engaging with the system, thus eliminating at least some (if not all) manual actions and facilitating generally hands-free access to the speech-enabled system. Use of a voice trigger may have several benefits, including greater accuracy by deliberately not recognizing speech not directed to the system, a reduced processing cost since only speech intended to be recognized is processed, less intrusive to users by only responding when a user wishes to interact with the system, and/or greater privacy since the system may only transmit or otherwise process speech that was uttered with the intention of the speech being directed to the system.

A voice trigger may comprise a designated word or phrase that is spoken by the user to indicate to the system that the user intends to interact with the system (e.g., to issue one or more commands to the system). Such voice triggers are also referred to herein as a "wake-up word" or "WuW" and refer to both single word triggers and multiple word triggers. Typically, once the wake-up word has been detected, the system begins recognizing subsequent speech spoken by the user. In most cases, unless and until the system detects the wake-up word, the system will assume that the acoustic input received from the environment is not directed to or intended for the system and will not process the acoustic input further. However, requiring WuW may cause unnecessary effort by the users and increase frustration.

SUMMARY

A vehicle system for classifying spoken utterance within a vehicle cabin as one of system-directed and non-system directed, the system may include at least one microphone configured to detect at least one acoustic utterance from at least one occupant of a vehicle, at least one sensor to detect user behavior data indicative of user behavior, and a processor programmed to: receive the acoustic utterance, classify the acoustic utterance as one of a system-directed utterance and a non-system directed utterance, determine whether the acoustic utterance was properly classified based on user behavior observed via data received from the sensor after the classification, and apply a mitigating adjustment to classifications of subsequent acoustic utterances based on an improper classification.

A method for classifying spoken utterances within a vehicle cabin as one of system-directed and non-system directed, the method may include receiving an acoustic utterance, classifying the acoustic utterance as one of a system-directed utterance and a non-system directed utterance, determining whether the acoustic utterance was properly classified based on user behavior observed via data received from a sensor after the classification, and applying a mitigating adjustment to classifications of subsequent acoustic utterances based on an improper classification.

A non-transitory computer-readable medium storing computer-executable instructions, that when executed by at least one processor, cause the at least one processor to receive an acoustic utterance, classify the acoustic utterance as one of a system-directed utterance and a non-system directed utterance, determine whether the acoustic utterance was properly classified based on user behavior observed via data received from a sensor after the classification, and apply a mitigating adjustment to classifications of subsequent acoustic utterances based on an improper classification.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
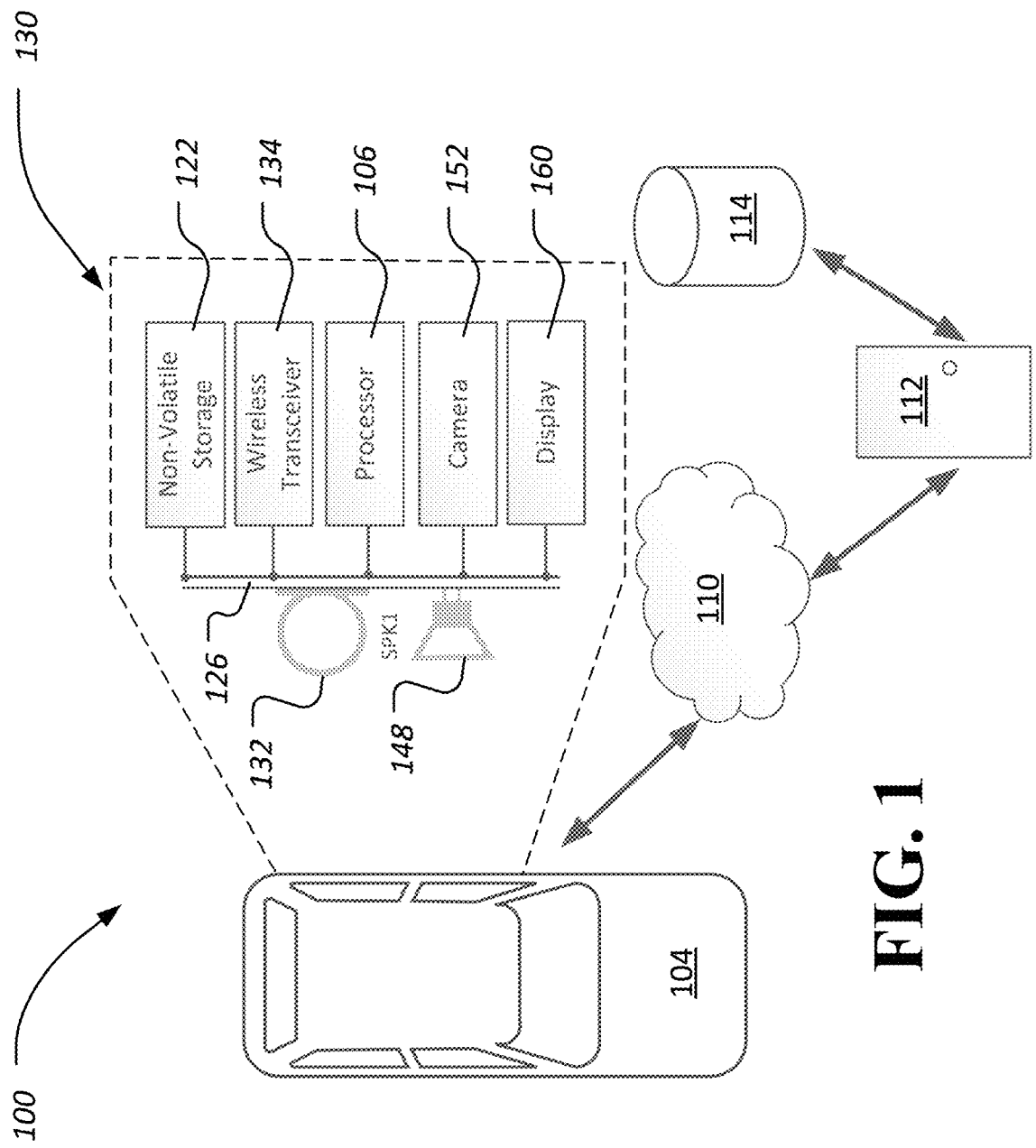
FIG. 1 illustrates a block diagram for a voice assistant system in an automotive application having a multimodal input processing system in accordance with one embodiment.

Voice command systems may analyze spoken commands from users to perform certain functions. For example, in a vehicle, a user may state "turn on the music." This may be understood to be a command to turn on the radio. Such commands are known as system-directed (SD) commands. Other times human speech may be human-to-human conversation and not intended to be a command. These utterances may be known as non-system directed (NSD) utterances. For example, a vehicle user may state "there was a concert last night and I hear the music was nice." However, in some situations, the system may incorrectly classify as SD or NSD. These improper classifications may be referred to as false accepts, where the utterance is incorrectly classified as SD and should have been NSD, or false rejects, where the utterance is incorrectly classified as NSD and should have been SD. Such incorrect classifications may cause frustrations to the user when an SD intended utterance is ignored, as well as when a NSD utterance is misunderstood as a command.

Disclosed herein is an error detection system for determining whether an utterance was correctly classified as an SD utterance, or a NSD utterance, based on user behavior following the utterance. For example, if a user states an utterance that is classified as NSD, but the user intended the utterance to be SD, the user may subsequently repeat the utterance. The subsequent utterance may be spoken louder, slower, with a wake-up-word, etc. This user behavior following the first utterance may indicate to the error detection system that the original NSD classification was a false reject. The user behavior may include audible behavior as well as other non-verbal behavior such as a gesture or altering of a head position or gaze. In some examples, the user behavior includes both audible and non-verbal behavior, such as looking at the head unit while repeating the utterance.

If the error detection system detects a false accept or false reject, the system may instruct for mitigating or remedial actions to be taken. Possible system reactions may be taken to improve the specific system of the user as well as to monitor and improve the technology for all users. The system reactions may fall into several categories discussed herein.

In one example, a remedial action includes tuning the SD/NSD classifier. This may include monitoring the output confidences of the classifier that determines whether an utterance is system directed. The system may then decide that the threshold to accept an utterance as system-directed is too high or too low, causing false reject or false accept errors, respectively. The system may then decide to adjust the threshold to reduce the cost to the user experience caused by the errors.

In another example, the system may monitor the SD/NSD classification errors and determine that errors frequently occur in a specific semantic domain (e.g., weather information). The system may then decide to turn off the automatic SD/NSD classification for this specific domain. This may make the system more robust.

In a further example, the dialog strategy may be changed or adjusted. This may include monitoring the SD/NSD classification errors as well. The system may determine that errors frequently occur for a specific dialogue function or situation, for instance for wake-up word recognition, when multiple people are in the car, when the noise level exceeds a given level, etc. The system may then decide to turn off the automatic SD/NSD classification when this scenario occurs.

In yet another example, the user may be notified or inquired with. This may include determining that the dialogue system does not behave as intended, e.g., has a prohibitively high error rate for a given scenario. The system may notify the user and possibly apologize to the user for the error. The dialogue system may also notify the user that it will change its behavior, or alternatively, ask the user if he/she wants to change the system settings, for instance, turning off a speech dialogue feature for an error-prone situation.

In a further example, the system may provide a log for system monitoring and improvement where the dialogue system may also decide to transfer the information that an error occurred, and meta information on the reason for the transfer. This may be the case in the situation where an off-board server may be used to monitor the performance of an individual system, as well as a group of systems and users. This may allow for validation of the dialog design by monitoring the performance of indicators such as task completion rate and time. This may provide user experience intelligence, for example, by showing which function is used and how often, and pinpointing errors in the intelligence. This may include pinpointing errors in the system for trouble shooting and provide information for trouble shooting and providing information for improved classifies based on the logged data.

FIG. 1 illustrates a block diagram for an automotive voice assistant system 100 having a multimodal input processing system in accordance with one embodiment. The automotive voice assistant system 100 may be designed for a vehicle 104 configured to transport passengers. The vehicle 104 may include various types of passenger vehicles, such as crossover utility vehicle (CUV), sport utility vehicle (SUV), truck, recreational vehicle (RV), boat, plane or other mobile machine for transporting people or goods. Further, the vehicle 104 may be autonomous, partially autonomous, self-driving, driverless, or driver-assisted vehicles. The vehicle 104 may be an electric vehicle (EV), such as a battery electric vehicle (BEV), plug-in hybrid electric vehicle (PHEV), hybrid electric vehicle (HEVs), etc.

The vehicle 104 may be configured to include various types of components, processors, and memory, and may communicate with a communication network 110. The communication network 110 may be referred to as a "cloud" and may involve data transfer via wide area and/or local area networks, such as the Internet, Global Positioning System (GPS), cellular networks, Wi-Fi, Bluetooth, etc. The communication network 110 may provide for communication between the vehicle 104 and an external or remote server 112 and/or database 114, as well as other external applications, systems, vehicles, etc. This communication network 110 may provide navigation, music or other audio, program content, marketing content, internet access, speech recognition, cognitive computing, artificial intelligence, to the vehicle 104.

The remote server 112 and the database 114 may include one or more computer hardware processors coupled to one or more computer storage devices for performing steps of one or more methods as described herein and may enable the vehicle 104 to communicate and exchange information and data with systems and subsystems external to the vehicle 104 and local to or onboard the vehicle 104. The vehicle 104 may include one or more processors 106 configured to perform certain instructions, commands and other routines as described herein. Internal vehicle networks 126 may also be included, such as a vehicle controller area network (CAN), an Ethernet network, and a media oriented system transfer (MOST), etc. The internal vehicle networks 126 may allow the processor 106 to communicate with other vehicle 104 systems, such as a vehicle modem, a GPS module and/or Global System for Mobile Communication (GSM) module configured to provide current vehicle location and heading information, and various vehicle electronic control units (ECUs) configured to corporate with the processor 106.

The processor 106 may execute instructions for certain vehicle applications, including navigation, infotainment, climate control, etc. Instructions for the respective vehicle systems may be maintained in a non-volatile manner using a variety of types of computer-readable storage medium 122. The computer-readable storage medium 122 (also referred to herein as memory 122, or storage) includes any non-transitory medium (e.g., a tangible medium) that participates in providing instructions or other data that may be read by the processor 106. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/structured query language (SQL).

The processor 106 may also be part of a multimodal processing system 130. The multimodal processing system 130 may include various vehicle components, such as the processor 106, memories, sensors, input devices, displays, etc. The multimodal processing system 130 may include one or more input and output devices for exchanging data processed by the multimodal processing system 130 with other elements shown in FIG. 1. Certain examples of these processes may include navigation system outputs (e.g., time sensitive directions for a driver), incoming text messages converted to output speech, vehicle status outputs, and the like, e.g., output from a local or onboard storage medium or system. In some embodiments, the multimodal processing system 130 provides input/output control functions with respect to one or more electronic devices, such as a heads-yup-display (HUD), vehicle display, and/or mobile device of the driver or passenger, sensors, cameras, etc. The multimodal processing system 130 includes an error detection system configured to detect improper classification of utterances by using user behavior detected by the vehicle sensors, as described in more detail below.

The vehicle 104 may include a wireless transceiver 134, such as a BLUETOOTH module, a ZIGBEE transceiver, a Wi-Fi transceiver, an IrDA transceiver, a radio frequency identification (RFID) transceiver, etc.) configured to communicate with compatible wireless transceivers of various user devices, as well as with the communication network 110.

The vehicle 104 may include various sensors and input devices as part of the multimodal processing system 130. For example, the vehicle 104 may include at least one microphone 132. The microphone 132 may be configured receive audio signals from within the vehicle cabin, such as acoustic utterances including spoken words, phrases, or commands from a user. The microphone 132 may include an audio input configured to provide audio signal processing features, including amplification, conversions, data processing, etc., to the processor 106. As explained below with respect to FIG. 2, the vehicle 104 may include at least one microphone 132 arranged throughout the vehicle 104. While the microphone 132 is described herein as being used for purposes of the multimodal processing system 130, the microphone 132 may be used for other vehicle features such as active noise cancelation, hands-free interfaces, etc. The microphone 132 may facilitate speech recognition from audio received via the microphone 132 according to grammar associated with available commands, and voice prompt generation. The microphone 132 may include a plurality of microphones 132 arranged throughout the vehicle cabin.

The vehicle 104 may include an audio system having audio playback functionality through vehicle speakers 148 or headphones. The audio playback may include audio from sources such as a vehicle radio, including satellite radio, decoded amplitude modulated (AM) or frequency modulated (FM) radio signals, and audio signals from compact disc (CD) or digital versatile disk (DVD) audio playback, streamed audio from a mobile device, commands from a navigation system, etc.

As explained, the vehicle 104 may include various displays 160 and user interfaces, including HUDs, center console displays, steering wheel buttons, etc. Touch screens may be configured to receive user inputs. Visual displays may be configured to provide visual outputs to the user.

The vehicle 104 may include at least one occupant detector device 152 (also referred to herein as camera 152). The occupant detector device 152 may be a position sensor and/or camera configured to detect the direction of the user's gaze, user gestures, etc. The occupant detector device 152 may monitor the driver head position, as well as detect any other movement by the user, such as a motion with the user's arms or hands, shaking of the user's head, etc. In the example of a camera 152, the camera 152 may provide imaging data taken of the user to indicate certain movements made by the user. The camera 152 may be a camera capable of taking still images, as well as video and detecting user head, eye, and body movement. The camera 152 may include multiple cameras and the imaging data may be used for qualitative analysis. For example, the imaging data may be used to determine if the user is looking at a certain location or vehicle display. Additionally or alternatively, the imaging data may also supplement timing information as it relates to the user motions or gestures.

While not specifically illustrated herein, the vehicle 104 may include numerous other systems such as GPS systems, human-machine interface (HMI) controls, video systems, etc. The multimodal processing system 130 may use inputs from various vehicle systems, including the speaker 148 and the occupant detector device 152, to detect, receive, and analyze occupant behavior. This behavior may be in the form of receiving audio commands, as well as non-verbal behavior in the form of head position, gaze direction, user gestures, etc. This user behavior may be used to determine whether the multimodal processing system 130 accurately classified an utterance.

For example, the multimodal processing system 130 may determine whether an utterance by a user is system-directed (SD) or non-system directed (NSD). SD utterances may be made by a user with the intent to affect an output within the vehicle 104 such as a spoken command of "turn on the music." A NSD utterance may be one spoken during conversation to another occupant, while on the phone, or speaking to a person outside of the vehicle 104. These NSDs are not intended to affect a vehicle output or system. The NSDs may be human-to-human conversations.

While an automotive system is discussed in detail here, other applications may be appreciated. For example, similar functionally may also be applied to other, non-automotive cases, e.g. for augmented reality or virtual reality cases with smart glasses, phones, eye trackers in living environment, etc. While the terms "user" is used throughout, this term may be interchangeable with others such as speaker, occupant, etc.

Figure 2:
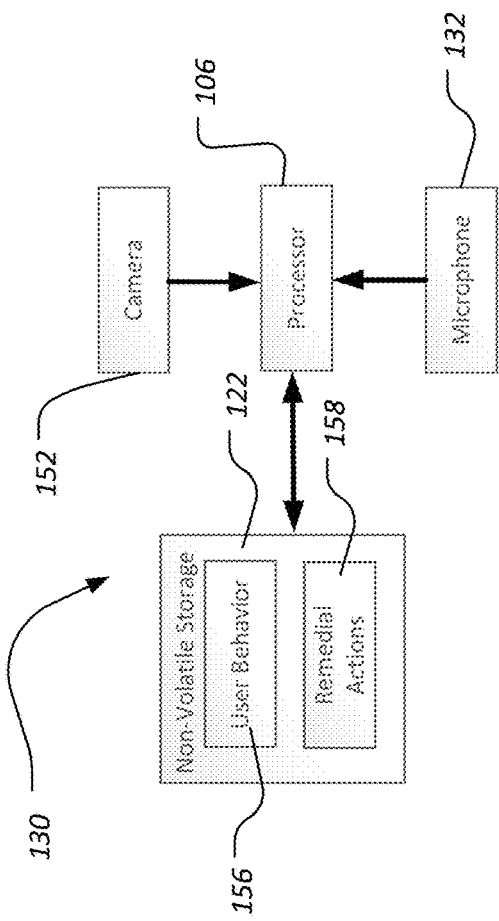
FIG. 2 illustrates an example block diagram of at least a portion of the system of FIG. 1.

FIG. 2 illustrates an example block diagram of a portion of the multimodal processing system 130. In this example block diagram, the processor 106 may be configured to communicate with the microphones 132, occupant detector devices 152, and memory 122.

The memory 122 may be configured to maintain a user behavior database 156 that maintains a database of known user behaviors that may be associated with utterance classification errors. The user behaviors may include both audible and physical reactions to a system action. The user behaviors may also be in response to the vehicle's reaction to a user utterance, especially if the utterance was falsely rejected or falsely accepted.

Possible user behavior actions that serve as indicator for a system error may fall into several categories. In one example, the user behavior may include repeating certain utterances. This may especially be the case in repeating false rejection errors where when a user utterance has not been accepted as SD, the user may repeat the utterance. He/she may possibly do so by re-formulating the utterance.

In another example, where false accept errors have been detected, or when a command has been misunderstood, the system may detect this, for example, when an undesirable system reaction is received, or in other cases, no reaction is received.

The user may dictate that the false accept error should be corrected. This may also be the case when a command has been misunderstood. For example, when an undesirable system reaction has been triggered, as well as lack of a trigger or action all together, the user may decide to issue a corrective command in an effort to correct the system, e.g. by starting the correction command saying "no, I want . . . " and repeating the original command. He/she may also repeat a misunderstood salient content word.

The user may also focus and/and emphasis the command to provide clarification. Often, when repeating and correcting per voice command, this is done with clear and strong focus. In the event of an audible behavior, the user may talk louder, more pronounced, and/or with a lower voice, alter the pronunciation to emphasize an important content word or phrase of the command, talk slower, allow for more time between words, etc. Especially for false reject error correction, the user may also add emphasis by repeating an utterance, this time directly addressing the dialogue system by speaking the wake-up word (which is often the name of the voice assistant). In the event of a non-vocal physical behavior, the user may redirect his or her gaze, change his or her head direction, move his or her arms, shake his or her head, etc.

The user may cancel a system action, possibly re-starting the dialogue, if the system erroneously triggers an action—such as e.g. navigation to a specific destination or calling the wrong contact on the phone. This may be done, for example, by another voice command such as "cancel" or per haptic activity such as pressing a cancel button on the head unit.

The user may also show an emotional response to the wrong system action. The user may, for instance, become agitated and use profanity, or 'yell' at the system, in a way that conveys the user's frustration. This emotional response may be detected on a text level—e.g. notifying profanity or finding phrases such as "you are stupid"—or on the non-verbal level, both vocal (for instance in prosodic cues) or physical (e.g. per gestures). The user may also laugh in response to the false reject or false accept.

In some examples, the user behavior may be a combination of audible and physical activities such as looking at the center console while repeating the command. In another example, the user's facial expression may also be taken into consideration, such as when a user's facial expression looks confused or is expecting an answer.

Certain user behaviors may be cataloged in the user behavior database 156 and be used as an indicator of improper classification of an utterance. Furthermore, additional behaviors may be added to the database 156 to allow for machine learning of additional behaviors that may indicate an improper classification.

The user behavior database 156 may also store statistical information when and how often these behaviors occur, e.g. a distribution of duration how long after the wrong system action the user is cancelling this action, so that the system can estimate how likely it is that the user behavior action is related to a system error.

The memory 122 may also maintain a remedial action database 158. The remedial action database 158 may maintain a list actions to be taken if the processor 106 determines that a user behavior indicates a false accept or false reject. For example, if a user states an utterance and that utterance is classified as NSD, no actions may be taken in response to the utterance. Unsatisfied, the user may then repeat the utterance louder than the initial command. Because the user spoke the same utterance but in a louder form, the processor 106 may determine that the first utterance was a false reject. This may include comparing the volume and the substance of the utterance to the most recent utterance. The memory 122 may maintain thresholds, that if exceeded, may indicate that the volume level is louder. This, coupled with a repeat utterance may indicate frustration by the user.

Once the processor 106 determines that the initial utterance was a false reject, the processor 106 may then, based on the list of remedial actions in the remedial action database 158, select certain actions to take. These actions may range from apologizing to the user, either via the display 160 or an audible apology through the speakers 148, to updating certain thresholds and models to better classify future utterances.

The processor 106 may receive imaging data from the cameras 152, such as gaze direction, a gesture, head position, etc. The processor 106 may also receive an utterance from the microphone 132 and correspond the utterance to the imaging data received at or around the same time as the utterance. The processor 106 may determine whether this user behavior data is indicative of a certain gaze direction (e.g., the gaze directions 166 as illustrated in FIG. 2), or head position. In one example, the user's gaze may be directed to the center console or head unit to see if the vehicle 104 reacted to the recent utterance. In another example, the user's gaze may be directed to a control button related to the utterance, such as a climate control knob, volume knob, etc. These behaviors may indicate a false accept or false positive, especially if the gaze is directed to a control or vehicle component related to the utterance (e.g., user is looking at the climate control and the utterance includes the word "temperature.")

Thus, by using cues from user behavior both physical and audible, the error detection system of the multimodal processing system 130 may more accurately detect false accepts or false rejects based on the user behavior. The non-speech data, such as the user data, may be used in determining whether the utterance should have been system-directed or not. The correlation between the subsequent spoken utterance and the user's behavior may also be used to detect classification errors. By more accurately classifying utterances, false activation of system responses, or failure to recognize system-directed speech, may decrease and user satisfaction of the automotive voice assistant system 100 will increase.

Furthermore, the multimodal processing system 130 may continually be learning based on user behavior to improper classifications. This includes maintaining user behaviors in response to certain classifications. The multimodal processing system 130 classify an utterance as NSD, and thus does not process or respond to the utterance. However, if the user actually intended the utterance to be a command and thus SD, the user may repeat the utterance. The multimodal processing system 130 may recognize the repeat, as well as the user's audible behavior and possible non-verbal physical behavior in speaking the second occurrence of the utterance. The multimodal processing system 130 may recognize that the first occurrence should have been classified as system-directed, and the memory 122 and associated databases may be updated to include characteristics such as the user behavior at the time just after the occurrence of the utterance to better identify when an error has occurred.

Figure 3:
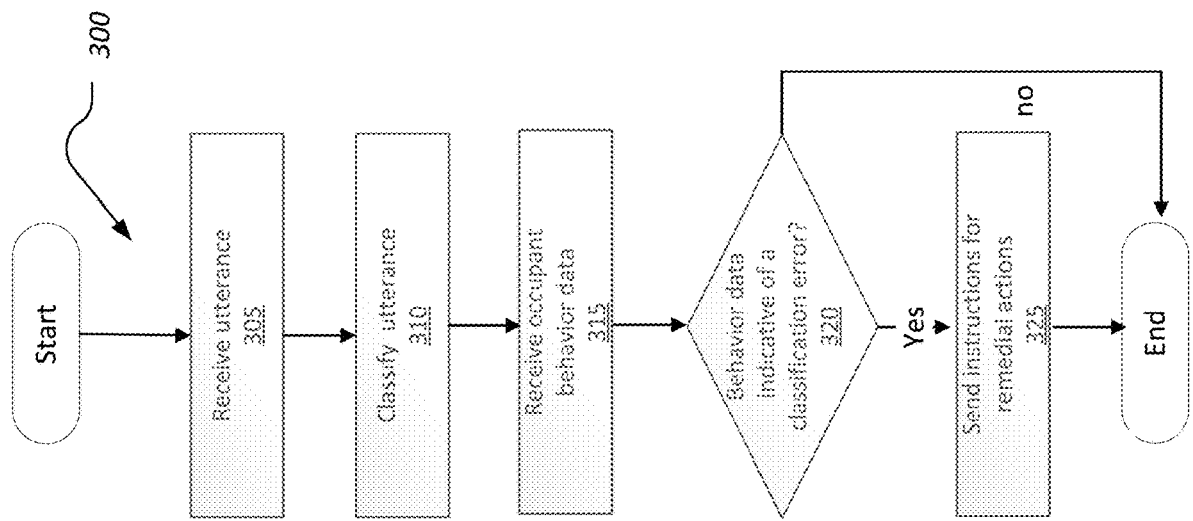
FIG. 3 illustrates an example flow chart for a process for the automotive voice assistant system of FIG. 1.

FIG. 3 illustrates an example flow chart for a process 300 for the automotive voice assistant system 100 of FIG. 1. The process 300 may begin at block 305, where the processor 106 receives an utterance from the microphone 132. The utterance may include human voice sounds that are either SD and intended to provide a command or request to the multimodal processing system 130, or NSD utterance that is typical human to human conversation.

At block 310, the processor 106 may determine whether the utterance is SD or NSD. This may include determining characteristics of the utterance, such as the tone, direction, occupant position within the vehicle, the specific occupant based on voice recognition, etc. Signal processing techniques including filtering, noise cancelation, amplification, beamforming, to name a few, may be implemented to process the utterance. In some instances, the tone of the utterance alone may be used to classify the utterance as SD or NSD.

At block 315, the processor 106 may receive occupant behavior data from the camera 152 and/or speaker 154. The occupant behavior data may be acquired within a certain time frame after the utterance was spoken. For example, the occupant behavior may be acquired for the 20 seconds after the initiation of the utterance. The occupant behavior data, as explained, may include data visually depicted or acquired by the camera 152 and indicative of a gaze direction, gesture, or head position, of the user, as well as audible data including subsequent utterances from the user.

At block 320, the processor 106 may determine whether the occupant behavior data is indicative of a false accept or false reject. For example, a gesture of shaking one's head may indicate dissatisfaction with the vehicle response to the utterance and thus lead the processor 106 to determine that the utterance was classified in error. As explained, the user behavior data may indicate that the user is gazing or looking at a certain vehicle object such as the center console while audibly repeating the utterance. The processor 106 may thus determine, via the user behavior database 156, that the behavior is indicative of the user not being satisfied. If the processor 106 determines that the user behavior is indicative of an improper classification, the process 300 proceeds to block 335. If not, the process 300 ends.

At block 325, in response to the user behavior identifying the utterance as improperly classified, the processor 106 may look up, based on the remedial action database 158, available mitigating actions in response to the improper classifications. As explained, this may include adjusting thresholds, changing model scopes, apologizing to the user, etc. The processor 106 may send instructions to the appropriate vehicle component for carrying out the actions. For example, the processor 106 may instruct the microphone 132 to issue an audible apology. The process may then end.

Accordingly, described herein is a system configured to determine whether an utterance was classified correctly as system-directed or non-system-directed based on user behavior. The user behavior may include audible and non-verbal physical behavior to indicate satisfaction or dissatisfaction with a vehicle's response to an utterance.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system for classifying spoken utterance within a vehicle cabin as one of system-directed and non-system directed, the system comprising:
   at least one microphone configured to detect at least one acoustic utterance from at least one occupant of a vehicle;
   at least one sensor to detect user behavior data indicative of user behavior; and
   a processor programmed to:
      receive the acoustic utterance,
      classify the acoustic utterance as one of a system-directed utterance and a non-system directed utterance,
      determine whether the acoustic utterance was properly classified based on user behavior observed via data received from the sensor after the classification, and
      apply a mitigating adjustment to classifications of subsequent acoustic utterances based on an improper classification, wherein the mitigating adjustment includes adjusting a confidence threshold for determining whether the acoustic utterance is one of a system-directed utterance and a non-system directed utterance.

2. The system of claim 1, wherein the processor is further programmed to transmit and receive the mitigating adjustment from an off-board server.

3. The system of claim 1, wherein the user behavior includes repeating of the acoustic utterance.

4. The system of claim 1, wherein the user behavior includes a corrective command.

5. The system of claim 1, wherein the user behavior includes a subsequent acoustic utterance with differing pronunciation or tone than that of the prior acoustic utterance.

6. The system of claim 1, wherein the user behavior includes an action indicative of canceling of the acoustic utterance.

7. The system of claim 1, wherein the user behavior includes a subsequent acoustic utterance including a profanity.

8. A method for classifying spoken utterances within a vehicle cabin as one of system-directed and non-system directed, the method comprising:
   receiving an acoustic utterance;
   classifying the acoustic utterance as one of a system-directed utterance and a non-system directed utterance;
   determining whether the acoustic utterance was properly classified based on user behavior observed via data received from a sensor after the classification; and
   applying a mitigating adjustment to classifications of subsequent acoustic utterances based on an improper classification, wherein the mitigating adjustment includes identifying an error specific to a semantic domain and ignoring classification of that domain.

9. The method of claim 8, further comprising transmitting and receiving the mitigating adjustment from an off-board server.

10. The method of claim 8, wherein the user behavior includes repeating of the acoustic utterance.

11. The method of claim 8, wherein the user behavior includes a corrective command.

12. The method of claim 8, wherein the user behavior includes a subsequent acoustic utterance with differing pronunciation or tone than that of the prior acoustic utterance.

13. The method of claim 8, wherein the user behavior includes an action indicative of canceling of the acoustic utterance.

14. A non-transitory computer-readable medium storing computer-executable instructions, that when executed by at least one processor, cause the at least one processor to:
   receive an acoustic utterance,
   classify the acoustic utterance as one of a system-directed utterance and a non-system directed utterance,
   determine whether the acoustic utterance was properly classified based on user behavior observed via data received from a sensor after the classification, and
   apply a mitigating adjustment to classifications of subsequent acoustic utterances based on an improper classification, wherein the mitigating adjustment includes identifying an error specific to a dialog and situation and ignoring classification during the situation.

* * * * *